(12) United States Patent
Krishnaswamy et al.

(10) Patent No.: US 9,703,520 B1
(45) Date of Patent: Jul. 11, 2017

(54) NEGOTIATION OF A FUTURE COMMUNICATION BY USE OF A PERSONAL VIRTUAL ASSISTANT (PVA)

(75) Inventors: Venkatesh Krishnaswamy, Holmdel, NJ (US); Timothy Ian Ross, Fair Haven, NJ (US); Rajeshwari Edamadaka, Allentown, NJ (US); Jack Iu, South Plainfield, NJ (US); Krishna Kishore Dhara, Dayton, NJ (US); Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1586 days.

(21) Appl. No.: 12/038,432

(22) Filed: Feb. 27, 2008

Related U.S. Application Data

(60) Provisional application No. 60/930,909, filed on May 17, 2007.

(51) Int. Cl.
  *G06F 3/14* (2006.01)
  *G06F 3/16* (2006.01)
  *G10L 21/10* (2013.01)

(52) U.S. Cl.
  CPC .............. *G06F 3/165* (2013.01); *G10L 21/10* (2013.01)

(58) Field of Classification Search
  USPC ......... 715/200–277, 700–867; 700/701–866; 709/201–229; 705/26, 50–79; 345/30–111; 348/206–231.9; 707/1–10, 707/100–104.1, 200–206
  See application file for complete search history.

(56) References Cited

U.S. PATENT DOCUMENTS

| | | | |
|---|---|---|---|
| 5,652,789 A | 7/1997 | Miner et al. | |
| 6,411,685 B1 | 6/2002 | O'Neal | |
| 6,532,489 B1 | 3/2003 | Merchant | |
| 6,650,739 B1 | 11/2003 | Doeberl et al. | |
| 6,704,039 B2 * | 3/2004 | Pena | 348/14.01 |
| 6,757,362 B1 | 6/2004 | Cooper et al. | |
| 6,804,332 B1 | 10/2004 | Miner et al. | |
| 6,970,548 B2 | 11/2005 | Pines et al. | |
| 7,007,067 B1 | 2/2006 | Azvine et al. | |
| 7,133,837 B1 | 11/2006 | Barnes, Jr. | |
| 7,284,002 B2 | 10/2007 | Doss et al. | |
| 7,298,930 B1 | 11/2007 | Erol et al. | |
| 7,450,567 B1 | 11/2008 | Mamnani | |

(Continued)

OTHER PUBLICATIONS

Garcia-Guerra, Darlene; Final Office Action; U.S. Appl. No. 12/038,494; Jun. 23, 2016; United State Patent and Trademark Office; Alexandria, VA (Continued)

*Primary Examiner* — Ruay Ho

(57) ABSTRACT

Negotiation of a future communication through a personal virtual assistant is provided. A trigger command is received. The trigger command identifies a communication received for a recipient from a sender. Schedule information is accessed. The schedule information is related to the recipient of the received communication. A plurality of options is presented to the sender. The plurality of options are for arranging a future communication between the sender and the recipient, and include at least one option determined based on the accessed schedule information. A selection of an option for arranging a future communication is received. The selected option is executed to arrange the future communication.

22 Claims, 7 Drawing Sheets

(56) References Cited

U.S. PATENT DOCUMENTS

| | | | |
|---|---|---|---|
| 7,538,685 B1 | 5/2009 | Cooper et al. | |
| 7,606,866 B2 | 10/2009 | Mora | |
| 7,676,034 B1 | 3/2010 | Wu et al. | |
| 7,716,217 B2 | 5/2010 | Marston et al. | |
| 7,725,360 B2 | 5/2010 | Barnes, Jr. | |
| 7,844,671 B1 | 11/2010 | Lawler et al. | |
| 7,870,240 B1 | 1/2011 | Horvitz | |
| 7,941,491 B2 | 5/2011 | Sood | |
| 7,954,064 B2 | 5/2011 | Forstall et al. | |
| 8,364,467 B1 | 1/2013 | Bowman et al. | |
| 2002/0029203 A1 | 3/2002 | Pelland et al. | |
| 2002/0054072 A1 | 5/2002 | Hayes-Roth | |
| 2002/0095454 A1* | 7/2002 | Reed et al. | 709/201 |
| 2002/0110234 A1 | 8/2002 | Walker et al. | |
| 2002/0123331 A1 | 9/2002 | Lehaff et al. | |
| 2002/0144136 A1 | 10/2002 | Stornetta, Jr. et al. | |
| 2002/0169750 A1 | 11/2002 | Eaton, Jr. et al. | |
| 2002/0178022 A1 | 11/2002 | Anderson et al. | |
| 2003/0014533 A1 | 1/2003 | Greene et al. | |
| 2003/0046401 A1 | 3/2003 | Abbott et al. | |
| 2003/0163537 A1 | 8/2003 | Rohall et al. | |
| 2003/0195937 A1 | 10/2003 | Kircher, Jr. et al. | |
| 2004/0015699 A1 | 1/2004 | Thomas et al. | |
| 2004/0039786 A1 | 2/2004 | Horvitz et al. | |
| 2004/0073490 A1* | 4/2004 | Shah et al. | 705/26 |
| 2004/0143636 A1 | 7/2004 | Horvitz et al. | |
| 2004/0162871 A1 | 8/2004 | Pabla et al. | |
| 2004/0215721 A1 | 10/2004 | Szeto et al. | |
| 2004/0215723 A1 | 10/2004 | Chadha | |
| 2004/0225650 A1 | 11/2004 | Cooper et al. | |
| 2005/0021540 A1 | 1/2005 | McKee et al. | |
| 2005/0060638 A1 | 3/2005 | Mathew et al. | |
| 2005/0080866 A1 | 4/2005 | Kent, Jr. et al. | |
| 2005/0084082 A1* | 4/2005 | Horvitz et al. | 379/114.06 |
| 2005/0203929 A1 | 9/2005 | Hazarika et al. | |
| 2005/0204001 A1 | 9/2005 | Stein et al. | |
| 2005/0204009 A1 | 9/2005 | Hazarika et al. | |
| 2005/0210008 A1 | 9/2005 | Tran et al. | |
| 2005/0223072 A1 | 10/2005 | Greve et al. | |
| 2005/0262209 A1 | 11/2005 | Yu | |
| 2005/0278426 A1* | 12/2005 | Blagg | 709/204 |
| 2006/0010206 A1* | 1/2006 | Apacible et al. | 709/205 |
| 2006/0026253 A1 | 2/2006 | Kessen et al. | |
| 2006/0061488 A1 | 3/2006 | Dunton | |
| 2006/0067252 A1 | 3/2006 | John et al. | |
| 2006/0075033 A1 | 4/2006 | Bienstock et al. | |
| 2006/0081706 A1 | 4/2006 | Onischuk | |
| 2006/0109346 A1 | 5/2006 | Robinson et al. | |
| 2006/0195533 A1 | 8/2006 | Isozaki et al. | |
| 2006/0195534 A1 | 8/2006 | Isozaki et al. | |
| 2006/0235690 A1 | 10/2006 | Tomasic et al. | |
| 2006/0248043 A1 | 11/2006 | Powers | |
| 2007/0043687 A1 | 2/2007 | Bodart et al. | |
| 2007/0060096 A1 | 3/2007 | Hayakawa | |
| 2007/0088839 A1 | 4/2007 | Yoakum | |
| 2007/0113181 A1 | 5/2007 | Blattner et al. | |
| 2007/0115348 A1 | 5/2007 | Eppel et al. | |
| 2007/0121829 A1 | 5/2007 | Tal et al. | |
| 2007/0156656 A1 | 7/2007 | Pather et al. | |
| 2007/0165554 A1 | 7/2007 | Jefferson et al. | |
| 2007/0179945 A1 | 8/2007 | Marston et al. | |
| 2007/0203991 A1 | 8/2007 | Fisher et al. | |
| 2007/0217579 A1 | 9/2007 | Sobti et al. | |
| 2008/0005053 A1 | 1/2008 | Pulsipher | |
| 2008/0005238 A1 | 1/2008 | Hall et al. | |
| 2008/0005249 A1 | 1/2008 | Hart | |
| 2008/0028031 A1 | 1/2008 | Bailey et al. | |
| 2008/0162651 A1 | 7/2008 | Madnani | |
| 2008/0166990 A1 | 7/2008 | Toiv | |
| 2008/0205608 A1 | 8/2008 | Tal et al. | |
| 2008/0247529 A1* | 10/2008 | Barton et al. | 379/211.01 |
| 2008/0247530 A1* | 10/2008 | Barton et al. | 379/216.01 |
| 2008/0249778 A1* | 10/2008 | Barton et al. | 704/270 |
| 2009/0049139 A1 | 2/2009 | Fouotsop et al. | |

OTHER PUBLICATIONS

Warren S. Gifford et al.; "The Electronic Receptionist; A Knowledge-based Approach to Personal 2,ommunications"; book; ICWC '92; pp. 310-313; IEEE 1992.

Behnam Azvine et al.; "The Intelligent Assistant: An Overview"; book; Intelligent Systems and Soft Computing, pp. 215-238, 2000.

Related U.S. Appl. No. 12/038,470; entitled "Assisting a User, by Way of a Personal Virtual Assistant (PVA), in Responding to Communications"; filed Feb. 27, 2008 by Venkatesh Krishnaswamy.

Related U.S. Appl. No. 12/038,494; entitled "Assisting a User, by Way of a Personal Virtual Assistant (PVA), in Completing One or More Communication-Based Tasks"; filed Feb. 27, 2008 by Venkatesh Krishnaswamy.

Related U.S. Appl. No. 12/038,521; entitled "Method and Apparatus Providing Sender Information by Way of a Personal Virtual Assistant (PVA)"; filed Feb. 27, 2008 by Venkatesh Krishnaswamy.

Related U.S. Appl. No. 12/038,537; entitled "Negotiation of a Future Communication by Use of a Personal Virtual Assistant (PVA)"; filed Feb. 27, 2008 by Venkatesh Krishnaswamy.

<Ardos, Neil R.; Office Action; U.S. Appl. No. 12/038,470; Jun. 3, 2011; United States Patent and Trademark Office; Alexandria, VA.

Kardos, Neil R.; Final Office Action; U.S. Appl. No. 12/038,470; Oct. 14, 2011; United States Patent and Trademark Office; Alexandria, VA.

Lan, Tzu-Hsiang; Office Action; U.S. Appl. No. 12/038,470; Aug. 8, 2012; United States Patent and Trademark Office; Alexandria, VA.

Lan, Tzu-Hsiang; Final Office Action; U.S. Appl. No. 12/038,470; Jan. 3, 2013; United States Patent and Trademark Office; Alexandria, VA.

Lan, Tzu-Hsiang; Advisory Action; U.S. Appl. No. 12/038,470; Feb. 27, 2013; United States Patent and Trademark Office; Alexandria, VA.

Lan, Tzu-Hsiang; Office Action; U.S. Appl. No. 12/038,470; Jan. 3, 2014; United States Patent and Trademark Office; Alexandria, VA.

Lan, Tzu-Hsiang; Final Office Action; U.S. Appl. No. 12/038,470; Apr. 24, 2014; United States Patent and Trademark Office; Alexandria, VA.

Lan, Tzu-Hsiang; Advisory Action; U.S. Appl. No. 12/038,470; Jun. 20, 2014; United States Patent and Trademark Office; Alexandria, VA.

Lan, Tzu-Hsiang; Office Action; U.S. Appl. No. 12/038,470; Jul. 23, 2015; United States Patent and Trademark Office; Alexandria, VA.

Lan, Tzu-Hsiang; Final Office Action; U.S. Appl. No. 12/038,470; Jan. 29, 2016; United States Patent and Trademark Office; Alexandria, VA.

Lan, Tzu-Hsiang; Advisory Action; U.S. Appl. No. 12/038,470; Apr. 1, 2016; United States Patent and Trademark Office; Alexandria, VA.

Garcia-Guerra, Darlene; Office Action; U.S. Appl. No. 12/038,494; Jun. 21, 2011; United States Patent and Trademark Office; Alexandria, VA.

Garcia-Guerra, Darlene; Final Office Action; U.S. Appl. No. 12/038,494; Oct. 11, 2011; United States Patent and Trademark Office; Alexandria, VA.

Garcia-Guerra, Darlene; Office Action; U.S. Appl. No. 12/038,494; Jan. 3, 2012; United States Patent and Trademark Office; Alexandria, VA.

Garcia-Guerra, Darlene; Final Office Action; U.S. Appl. No. 12/038,494; Aug. 23, 2012; United States Patent and Trademark Office; Alexandria, VA.

Garcia-Guerra, Darlene; Advisory Action; U.S. Appl. No. 12/038,494; Nov. 2, 2012; United States Patent and Trademark Office; Alexandria, VA.

Garcia-Guerra, Darlene; Office Action; U.S. Appl. No. 12/038,494; Jun. 6, 2013; United States Patent and Trademark Office; Alexandria, VA.

Garcia-Guerra, Darlene; Office Action; U.S. Appl. No. 12/038,494; Dec. 20, 2013; United States Patent and Trademark Office; Alexandria, VA.

(56) References Cited

OTHER PUBLICATIONS

Garcia-Guerra, Darlene; Final Office Action; U.S. Appl. No. 12/038,494; Jun. 16, 2014; United States Patent and Trademark Office; Alexandria, VA.
Garcia-Guerra, Darlene; Advisory Action; U.S. Appl. No. 12/038,494; Sep. 30, 2014; United States Patent and Trademark Office; Alexandria, VA.
Garcia-Guerra, Darlene; Office Action; U.S. Appl. No. 12/038,494; Oct. 15, 2015; United States Patent and Trademark Office; Alexandria, VA.
Taha, Shaq; Office Action; U.S. Appl. No. 12/038,521; Jan. 1, 2010; United States Patent and Trademark Office; Alexandria, VA.
Taha, Shaq; Final Office Action; U.S. Appl. No. 12/038,521; Jun. 28, 2010; United States Patent and Trademark Office; Alexandria, VA.
Taha, Shaq; Office Action; U.S. Appl. No. 12/038,521; Aug. 18, 2010; United States Patent and Trademark Office; Alexandria, VA.
Taha, Shaq; Final Office Action; U.S. Appl. No. 12/038,521; Feb. 1, 2011; United States Patent and Trademark Office; Alexandria, VA.
Taha, Shaq; Advisory Action; U.S. Appl. No. 12/038,521; United States Patent and Trademark Office; Alexandria, VA.
Taha, Shaq; Notice of Allowance; U.S. Appl. No. 12/038,521; Jul. 18, 2011; United States Patent and Trademark Office; Alexandria, VA.
Ho, Ruay L; Office Action; U.S. Appl. No. 12/038,537; Nov. 24, 2010; United States Patent and Trademark Office; Alexandria, VA.
Ho, Ruay L; Final Office Action; U.S. Appl. No. 12/038,537; Mar. 1, 2011; United States Patent and Trademark Office; Alexandria, VA.
Ho, Ruay L; Advisory Action; U.S. Appl. No. 12/038,537; Apr. 19, 2011; United States Patent and Trademark Office; Alexandria, VA.
Ho, Ruay L; Office Action; U.S. Appl. No. 12/038,537; Jun. 21, 2011; United States Patent and Trademark Office; Alexandria, VA.
Ho, Ruay L; Final Office Action; U.S. Appl. No. 12/038,537; Sep. 21, 2011; United States Patent and Trademark Office; Alexandria, VA.
Ho, Ruay L; Office Action; U.S. Appl. No. 12/038,537; Nov. 30, 2011; United States Patent and Trademark Office; Alexandria, VA.
Ho, Ruay L; Final Office Action; U.S. Appl. No. 12/038,537; Mar. 9, 2012; United States Patent and Trademark Office; Alexandria, VaA.
Ho, Ruay L; Office Action; U.S. Appl. No. 12/038,537; May 24, 2012; United States Patent and Trademark Office; Alexandria, VA.
Ho, Ruay L; Final Office Action; U.S. Appl. No. 12/038,537; Nov. 5, 2012; United States Patent and Trademark Office; Alexandria, VA.
Ho, Ruay L; Advisory Action; U.S. Appl. No. 12/038,537; Dec. 19, 2012; United States Patent and Trademark Office; Alexandria, VA.
Ho, Ruay L; Office Action; U.S. Appl. No. 12/038,537; Dec. 4, 2015; United States Patent and Trademark Office; Alexandria, VA.
Ho, Ruay L; Final Office Action; U.S. Appl. No. 12/038,537; Apr. 28, 2016; United States Patent and Trademark Office; Alexandria, VA.
Garcia-Guerra, Darlene; Office Action issued in U.S. Appl. No. 12/038,494; Nov. 10, 2016; United States Patent and Trademark Office; Alexandria, VA.
Anderson, Folashade; Office Action issued in U.S. Appl. No. 12/038,470; Dec. 15, 2016; United States Patent and Trademark Office; Alexandria, VA.
Ho, Ruay L; Office Action issued in U.S. Appl. No. 12/038,537; Feb. 22, 2017; United States Patent and Trademark Office; Alexandria, VA.
Related U.S. Appl. No. 15/608,362; entitled 'Negotiation of a Future Communication by use of a Personal Virtual Assistant (PVA); filed May 30, 2017 by Venkatesh Krishnaswamy.

\* cited by examiner

NEGOTIATION OF A FUTURE COMMUNICATION BY USE OF A PERSONAL VIRTUAL ASSISTANT (PVA)

CROSS REFERENCE TO RELATED APPLICATIONS

The present application claims the benefit of U.S. Provisional Patent Application No. 60/930,909, filed on May 17, 2007, which is incorporated herein by reference in its entirety.

The present application is also related to co-pending applications: U.S. Ser. No. 12/038,470, entitled "ASSISTING A USER, BY WAY OF A PERSONAL VIRTUAL ASSISTANT (PVA), IN RESPONDING TO COMMUNICATIONS", U.S. Ser. No. 12/038,494, entitled "ASSISTING A USER, BY WAY OF A PERSONAL VIRTUAL ASSISTANT (PVA), IN COMPLETING ONE OR MORE COMMUNICATION-BASED TASKS", U.S. Ser. No. 12/038,521, entitled "Method and Apparatus Providing Sender Information By Way Of A Personal Virtual Assistant (PVA)", and U.S. Ser. No. 12/038,537, entitled "Method And Apparatus Providing Meeting Context Information", all filed on Feb. 27, 2008, all of which are hereby incorporated by reference in their entireties.

BACKGROUND

Many professionals, such as physicians, attorneys, sales representatives and others often find it difficult to communicate with clients, customers, colleagues and assistants. These professionals typically employ human assistants to relay important information, maintain their schedules and filter out all unnecessary interruptions. A virtual assistant is a computer application that allows the professional to access personal, company, and public information, including contacts, schedules, and databases from any interactive device, such as a telephone, laptop computer or Personal Digital Assistant (PDA).

One important function provided by a virtual assistant, which is also used ubiquitously by busy professionals who do not have a virtual assistant, is voice mail. Navigating large databases of non-messaging information, such as a contacts database, is quite cumbersome and difficult with conventional voice-mail systems and virtual assistants, particularly when the database is large and the user is attempting to access the database with a voice user interface.

While the deskbound worker has become even more empowered, the typical remote worker has a cellular telephone (cell phone) and a laptop computer. Easily getting access to corporate data and managing communication with others, especially while in transit, may be extremely challenging. One solution to the needs of a remote worker was realized in the form of a proxy, or Personal Virtual Assistant (PVA), which was available to the user and could help manage and coordinate communications and data access.

To a large degree, conventional PVAs allowed a remote worker, using only their voice and a cell phone, to have the same capabilities of e-mail (e.g., Microsoft Outlook) and a multi-function phone as their deskbound-counterparts. These capabilities included features such as read/annotate/forward/e-mail messages, including attachments, and finding messages based on sender, status (e.g., read, unread), type (e.g., e-mail, voice mail, meeting request), priority, etc. PVAs also allowed a user to listen to/forward/return voice mail messages and to accept meeting requests, list meetings, book meetings and the like. Further, PVAs also allowed a user to manage tasks and to call personal and corporate contacts.

PVAs also allowed a remote worker to utilize phone features. These features included placing outbound calls, initiating calls in response to a voice-mail (e.g., 'return this call'), using a personal or corporate contact, or activating this features just by saying or keying in a number. A remote worker was also permitted to receive calls with call screening. For example, if the remote worker was in a PVA session, then the remote worker would be alerted of the inbound call and be allowed to talk to that caller (separately or as part of a conference call) or send them to voice mail. The remote worker was also able to initiate conference calls and still be able to control each leg of conference. PVAs also provided remote workers with additional capabilities typical of their deskbound counterparts.

SUMMARY

Conventional voice-mail systems, as well as virtual assistants with voice-mail functionality, however, have disadvantages that limit their usefulness. For example, a professional, such as a physician or an attorney, is a person that many people attempt to contact throughout the day. Typically, however, it is not possible to directly contact such professionals via telephone. Rather, attempts to contact such professionals often result in communicating with that professional's voice-mail system. As the number of communications to a professional increase, the number of voice-mail messages left for that professional often correspondingly increase. If the professional is not able to regularly access his or her voice-mail due to other obligations, when the professional is able to access the voice-mail, for example at the end of the work day, the number of unheard voice-mail messages may be so large as to be virtually unmanageable, or at the least, very time-consuming. This issue may be due in part to being able to only listen to voice-mail messages one at a time, and in a particular sequence (e.g., in the order the voice-mail messages were received by the voice-mail system). This may cause the profession to either abandon use of the voice-mail system, because he or she does not have time to listen to and reply to every unheard message, one at a time, or to only listen to and respond to a fraction of the total number of unheard messages. As a result, it is even more difficult for people who attempt to contact the professional via telephone. People may thus resort to other options, such as contacting the professional in person, which may be impractical or too time-consuming, or using another message-based contact method (e.g., sending a page, sending an e-mail, sending an instant message, etc.) to attempt to contact the professional. If the volume of messages for any or all of those methods becomes large, the same problems arise as with voice-mail, and the cycle is repeated. Thus, the PVA may assist in managing interruptions when there is a high volume of incoming communications, and the user (i.e., a professional) could use help in taking care of these interruptions in a better way. That is, rather than allowing (for example) an incoming call to go to voicemail or having to go through the stress of interrupting the user's current activity and then return to it, the PVA allows a user to remove such interruptions that typically lead to reduced efficiency.

Embodiments of the invention significantly overcome such deficiencies and provide a personal virtual assistant that negotiates a future communication on behalf of a user (i.e., recipient) in response to a received communication. The personal virtual assistant acts in place of the user, though the user is able to provide input to the personal virtual assistant, or otherwise affect the outcome of the personal virtual assistant's actions. Further, the user is able to interrupt or override the personal virtual assistant at any time. Absent this, the personal virtual assistant allows the sender of the received communication to chose, from one or more options, a time and/or mode of communication through which a future communication will be scheduled to occur between the sender and the recipient. The personal virtual assistant is able to access some type and amount of scheduling data, corresponding to the recipient, to assist in presenting options to the sender. This allows the sender to chose from among a number of better options for communicating with the recipient, as opposed to simply selecting an option that works solely for the sender, and having to repeat the process later.

More specifically, in an embodiment there is provided a method of negotiating a future communication through a personal virtual assistant. The method includes receiving a trigger command, the trigger command identifying a communication received for a recipient from a sender, and accessing schedule information, the schedule information related to the recipient of the received communication. The method also includes presenting, to the sender, a plurality of options for arranging a future communication between the sender and the recipient, the plurality of options including at least one option determined based on the accessed schedule information; receiving a selection of an option for arranging a future communication; and executing the selected option to arrange the future communication.

In a related embodiment, the method may include, prior to presenting, receiving a customized option for arranging a future communication from the recipient, the customized option determined by the recipient. Presenting may include presenting, to the sender, a plurality of options for arranging a future communication between the sender and the recipient, the plurality of options including the customized option and at least one option determined based on the accessed schedule information.

In another related embodiment, the method may include presenting to the recipient a plurality of response options for selection, wherein any selected response options are included in the plurality of options presented to the sender. Presenting may include presenting, to the sender, a plurality of options for arranging a future communication between the sender and the recipient, the plurality of options including any selected response options and at least one option determined based on the accessed schedule information.

In yet another related embodiment, presenting may include presenting, to the sender, a plurality of options for arranging a future communication between the sender and the recipient, the plurality of options including at least one option determined based on the accessed schedule information, wherein the options are presented to the sender via a mode of communication different from the mode of communication used by the sender for the identified communication.

In still another related embodiment, executing may include informing the recipient and the sender of the arranged future communication by identifying a time and a mode of communication to be used for the future communication. In a further related embodiment, the method may include receiving from the sender an identification of the purpose of the received communication, and informing may include informing the recipient and the sender of the arranged future communication by identifying a time and a mode of communication to be used for the future communication; and informing the recipient of the received identification of the purpose of the received communication.

In yet still another related embodiment, receiving a selection may include receiving a selection of a negotiation option for arranging a future communication, and executing may include engaging in negotiation of the future communication with the sender, wherein the negotiation is based upon the accessed schedule information and results in an agreed upon time and mode of communication for the future communication.

In still yet another related embodiment, the method may include prior to receiving a selection, receiving a notification that the sender is represented by a sender personal virtual assistant; and negotiating a future communication with the sender personal virtual assistant. In a further related embodiment, negotiating may include exchanging at least one available time for the future communication with the sender personal virtual assistant, the at least one available time determined from the accessed schedule information; exchanging at least one available mode of communication for the future communication with the sender personal virtual assistant; and reaching an agreement with the sender personal virtual assistant on a time and a mode of communication for the future communication. In another further related embodiment, receiving a trigger command may include receiving a trigger command, the trigger command identifying a communication received for a recipient from a sender and a mode of communication through which the identified communication was received, and the method may include prior to negotiating, changing the mode of communication used to communicate with the sender personal virtual assistant.

In yet still another related embodiment, the method may include interrupting the personal virtual assistant to directly arrange a future communication with the sender.

In another embodiment, there is provided a computer program product, stored on computer readable medium. When executed on a processor, the computer program product negotiates a future communication through a personal virtual assistant. The computer program product includes computer program code for receiving a trigger command, the trigger command identifying a communication received for a recipient from a sender, and computer program code for accessing schedule information, the schedule information related to the recipient of the received communication. The computer program product also includes computer program code for presenting, to the sender, a plurality of options for arranging a future communication between the sender and the recipient, the plurality of options including at least one option determined based on the accessed schedule information, computer program code for receiving a selection of an option for arranging a future communication, and computer program code for executing the selected option to arrange the future communication.

In another embodiment there is provided a system. The system includes a processor; a memory system; a network interface; and an interconnection mechanism coupling the processor, memory system, and network interface, allowing communication there between. The memory system is encoded with a personal virtual assistant application that, when executed in the processor, provides a personal virtual assistant process that negotiates a future communication between a recipient and a sender. The personal virtual assistant process causes the computer system to perform operations of: receiving a trigger command, the trigger command identifying a communication received for a recipient from a sender; accessing schedule information, the schedule information related to the recipient of the received communication; presenting, to the sender, a plurality of options for arranging a future communication between the sender and the recipient, the plurality of options including at least one option determined based on the accessed schedule information; receiving a selection of an option for arranging a future communication; and executing the selected option to arrange the future communication.

Other arrangements of embodiments of the invention that are disclosed herein include software programs to perform the method embodiment steps and operations summarized above and disclosed in detail below. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone.

It is to be understood that the embodiments of the invention may be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure may be executed independently or in combination. Accordingly, the present invention may be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A Personal Virtual Assistant (PVA) comprises a unified communications application that is able to provide a user with assistance in handling interruptions, missed communications, outgoing calls, scheduling, and prioritizing communication tasks. The communications to and from the user may be of any style, including but not limited to, telephone calls (including those received via a landline of and type (e.g., copper wire, fiber optic, coaxial cable, etc.) and via a cellular network), instant messages (IMs), text messages, and e-mails.

The PVA includes a set of Internet Protocol (IP) telephony enhancements that support a communications intensive work-style or role. A PVA integrates easily into a user's desk phone, mobile phone, desktop computer, laptop computer, and/or e-mail program (e.g., Microsoft Outlook® available from Microsoft Corporation).

As used herein, a Personal Virtual Assistant includes a virtual assistant that may be active or passive, is multi-modal and multi-device in its ability to interface with a variety of communications platforms, executes in parallel with any and all communications platforms, and executes in real time, such that it offers and accepts a variety of real-time context-specific commands/options to a user, and then acts as a proxy to execute those commands/options with the sender(s) of a communication. Further, as used herein, a received communication is a communication that has been initiated by one party (e.g., but not limited to, a sender of an e-mail, or a person who picks up the phone and dials or otherwise instructs that phone to dial a number) and is intended for recipient by a second party or by a plurality of second parties, and is then received by a device and/or entity (or both) representing the intended recipient(s), such that at least some portion of information contained in or associated with the communication has been received by the device and/or entity (or both) representing the intended recipient(s). In other words, a received communication as used herein need not be a completed communication, such as, for example, when the sending party calls, via telephone, the receiving party, and the receiving party answers the call and the sending party and the receiving party begin to speak with each other.

Figure 1:
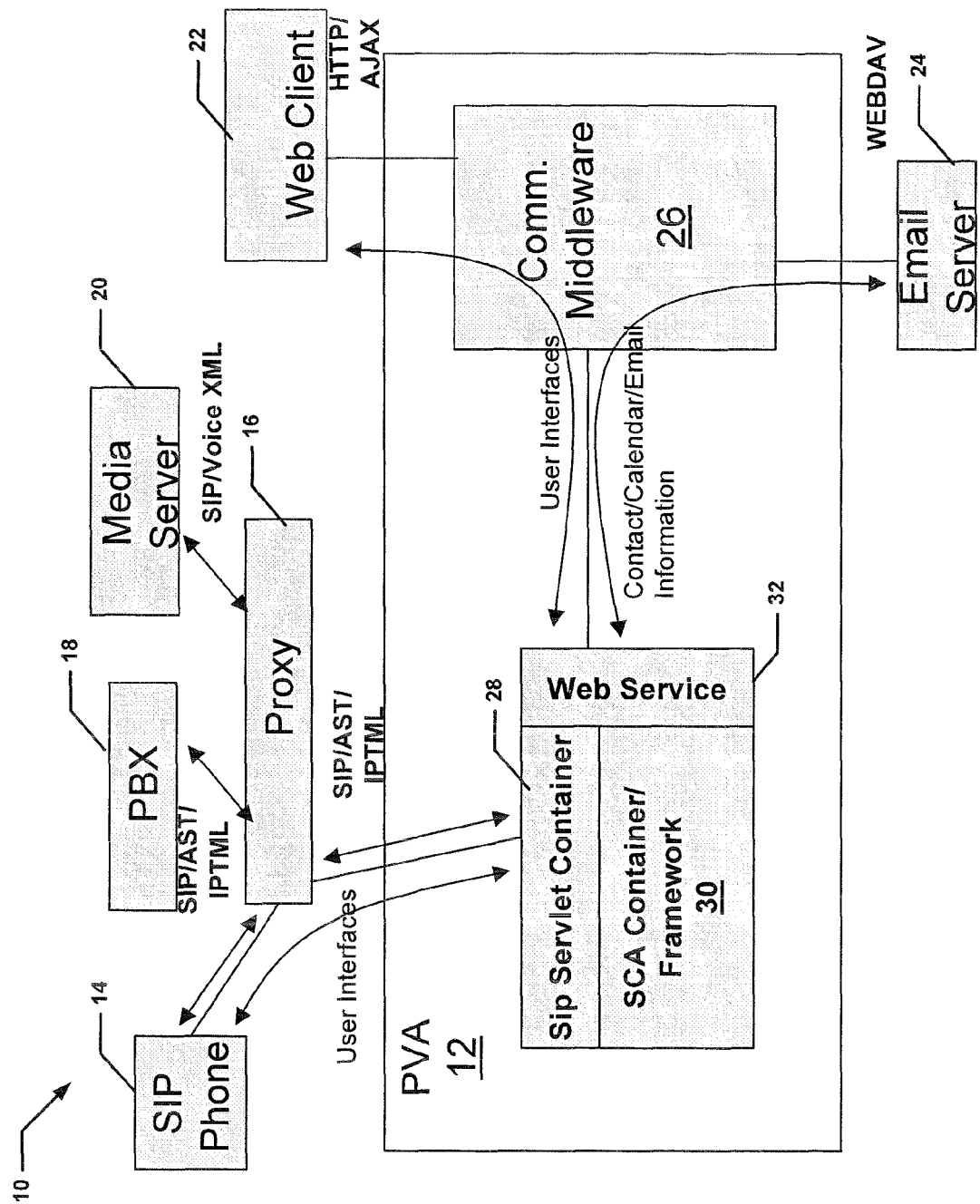
FIG. 1 depicts a block diagram showing various components and interfaces of a Personal Virtual Assistant in accordance with embodiments of the invention.

Referring now to FIG. 1, a particular embodiment of a PVA environment 10 in accordance with embodiments of the invention is shown. The PVA environment 10 includes a PVA 12 in communication with a SIP phone 14, a Proxy 16, Communications middleware 22 and an email server 24.

The Proxy 16 is in communication with a PBX 18 and a media server 20. Communication between PVA 12 and Proxy 16 is via a common protocol, for example Session Initiation Protocol (SIP), Advanced SIP Telephony (AST) or Internet Protocol Terminal Markup language (IPTML).

The PVA 12 includes a SIP servlet container 28, an Service Component Architecture (SCA) Continuer or Framework 30 and a Web Service 32. PVA 12 also includes Communication Middleware 26, which is a web-based software solution that provides users with control of telephony, conferencing, messaging, mobility administration, and access to corporate and personal contact information. The Communication Middleware 26 consolidates access to all the critical voice applications that a user needs. The Communication Middleware 26 allows the use of the desk phone while in the office and supports remote workers from any location. Communication Middleware 26 can be used by any employee from any Internet connection if they cannot get to an office location in the event of a business interruption. In this configuration the Communication Middleware 26 is used to communicate with the Email server 24 for obtaining contact/calendar/email information for PVA 12 and also to the Web client 32 by HyperText Transfer Protocol (HTTP) or AJAX. AJAX, which stands for asynchronous JavaScript and XML, is a conglomerate technology that enables dynamic, asynchronous behavior on Web pages without the need for browser page refreshes.

The PVA 12 works by attaching to the user's calls by bridging to the user's phone or by the sequenced applications determining features for an incoming or outgoing call for a particular user extension. The PVA 12 can thus observe incoming and outgoing calls, and can answer on the user's behalf. The PVA 12 maintains an information and control channel to the user.

The PVA 12 displays choices; acts on selections, and provides updates on actions being taken. Information regarding the communication, along with the communication itself, can be displayed on a phone screen, desktop or other device being used by the user.

PVA 12 is configured to act as a delegate on the user's email client, and therefore can securely access email and calendar information, subject to user's control. PVA 12 can be used to obtain information on meeting details. PVA can also be used to connect the user to the meeting and/or to relay a message saying that user will be late for the meeting.

When an incoming communication arrives, the PVA 12 provides an automated communication assisting process that renders information on a graphical user interface for a recipient of the incoming communication (i.e., a user) to view. The automated communication assisting process provides choices to the recipient via interruption management. The automated communication assisting process may also display additional information about the sender of the communication. In an example embodiment, the automated communication assisting process automatically displays a number of options for dealing with the incoming communication as soon as the communication arrives at the recipient. In another example embodiment, the recipient may select one of the options and instruct the PVA 12 to deal with the sender of the communication directly, without any further input from the recipient. The PVA 12 may then present a number of options to the sender, as is described in greater detail herein.

Figure 2:
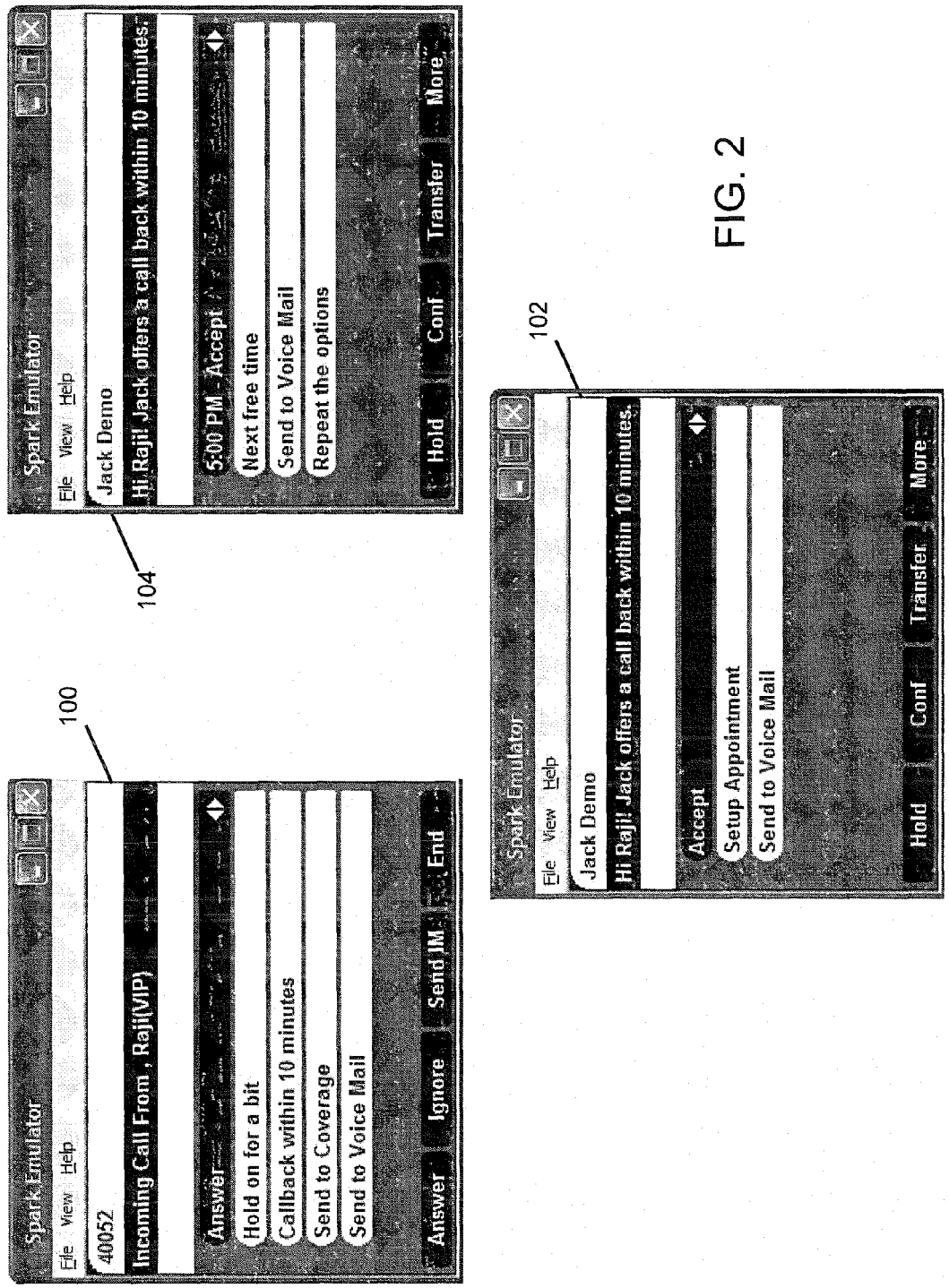
FIG. 2 depicts different options presented to a recipient of a communication and to a sender of a communication in order to negotiate a future communication.

FIG. 2 shows a number of example screenshots of an embodiment of the PVA as it provides options to both the recipient of an incoming communication, and to the sender of the incoming communication. In this example, the recipient (i.e., user) is presented with a pop-up 100 relating to how the recipient wishes to deal with the incoming communication. The communication from the sender to the user may take the form of a telephone call, an e-mail, a text message, an instant message (textual, audio or video), or any other form capable of communicating information. Different information regarding the sender of the communication may be made available to user as part of the original communication. For example, a telephone call may include a caller-id that indicates the identity of the person placing the call; an e-mail may include the name and e-mail address of the sender of the e-mail, and may also include information about a company or business the sender is associated with (e.g., a company name, phone number, and/or website). Further, the sender of the communication may be identified by an importance, such that very important persons (VIPs) are accordingly denoted by the PVA.

As shown in FIG. 2, when a communication arrives, the PVA presents a plurality of options 100 to the recipient of the communication. The options may include having the PVA deal with the incoming communication if, for example, the recipient of the communication is currently in a meeting and is not able to respond. Alternatively, the recipient may have the PVA direct the sender to hold on, or go to another user or to voice mail. Other options may include instructing the PVA to offer a particular future communication (i.e., "Callback within ten minutes") from the recipient to the sender. In the situation where the recipient directs the PVA to deal with the incoming communication, the PVA obtains information about the recipient's schedule to assist in determining when a future communication may be held between the recipient and the sender. For example, the PVA may have access to the recipient's scheduling application, such as the calendar functionality in Microsoft® Outlook. Using this scheduling information, the PVA is able to offer to the sender of the received communication one or more options for holding a future communication with the recipient. In some situations, these options may include static, default options that are always presented to a sender, such as leave the recipient a voice mail message or end the current communication and attempt a communication at any later time. In other situations, the options presented by the PVA may include options the recipient has specifically instructed the PVA to include, potentially including options specific to a particular sender. The PVA may also use a different mode of communication to present one or more options to the sender.

In some embodiments, the sender, upon encountering the PVA of the recipient, may activate his or her own PVA. This is shown in FIG. 2, where the sender sees a popup 102 upon activating his/her PVA. The two PVAs may then each take any of the steps described herein to negotiate, amongst themselves, a future communication between the sender and the recipient. Either the sender or the recipient may jump into the negotiation at any time and either override a decision may by their PVA or conduct the negotiation directly themselves. For example, as shown in FIG. 2, the sender PVA indicates to the sender that the recipient/recipient PVA is offering a callback in ten minutes. If the sender is available to speak with the recipient at that time, the sender may tell the sender PVA to accept that offer. In some embodiments, the negotiation (i.e., arranging) of the future communication may take further steps. For example, ff the sender tells the sender PVA to accept (in response to pop up 102), another pop up 104 may appear, indicating that the sender would receive a callback from the recipient at 5 PM. If that time was OK for the sender, the sender may instruct the sender PVA to accept that time. Alternatively, the sender may instruct the sender PVA to request the next available time.

Though the above description of the PVA shows that the user(s) (i.e., recipient/sender) may provide input at various stages to the PVA, the PVA is also capable of acting on its own with little or no input from the user, as is described further below.

FIGS. 3-6 are flowcharts of various embodiments of the personal virtual assistant process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
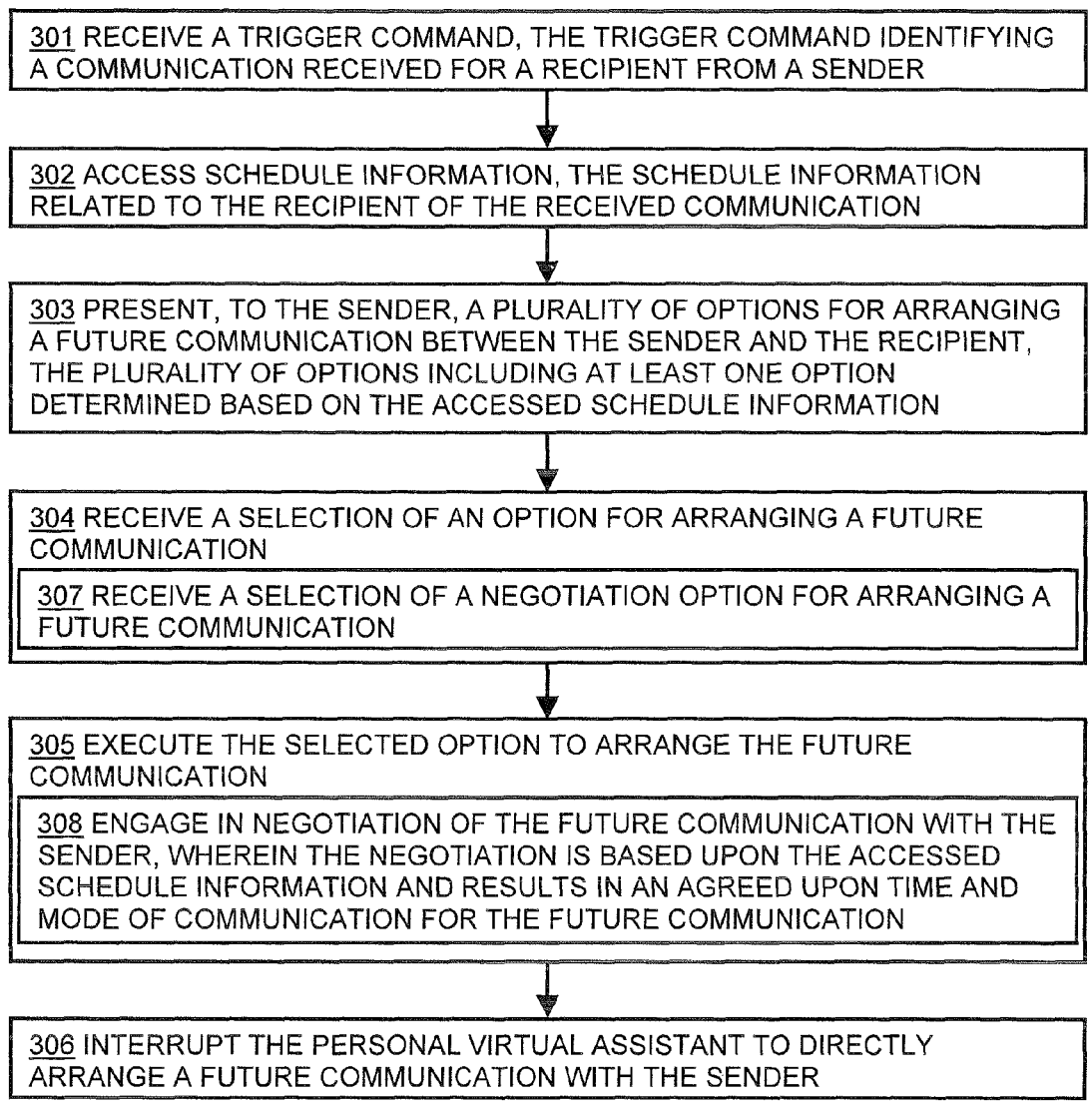
FIG. 3 illustrates a flowchart of a particular embodiment performed when a PVA negotiates a future communication with the sender of a communication.

FIG. 3 illustrates an embodiment 300 of a personal virtual assistant negotiating a future communication between the recipient and the sender of a received communication. The PVA first receives a trigger command, step 301. The trigger command identifies a communication received for a recipient from a sender. As described above in regards to FIG. 1, and specifically in regards to telephonic communications, the PVA bridges with a user's (i.e., recipient's) telephone number. The PVA thus sits in parallel with a user, as opposed to being in series with the user; that is, the PVA receives a communication, or notification of an incoming (i.e, received) communication, at the same time, or in some embodiment, at almost exactly the same time, as the recipient of the communication.

The trigger command may identify the received communication in any number of ways. For example, if the received communication is a telephone call, the trigger command may contain the telephone number of the sender (i.e., maker) of the call, and/or may include the identity of the sender as well (such as is provided through caller-id functionality). Alternatively, if the received communication is an e-mail, instant message, or other similar text-based communication, the trigger command may contain the return e-mail address/ screen name of the sender of the communication, taken from the communication itself, as well as any other details the communication may contain (such as contact information found within an e-mail signature). Further, in some embodiments, the PVA may use methods or systems described in detail in the co-pending application entitled "Method and Apparatus Providing Sender Information By Way Of A Personal Virtual Assistant (PVA)", U.S. Ser. No. 12/038,521, and filed on the same date as the present application, to gather further information about the sender of the communication.

In some embodiments, the trigger command is a command received from the user that instructs the PVA to handle the received communication. A user may so instruct the PVA in situations where the user is unable to address the communication directly, such as when the user is in an important meeting and is unable to, for example, pick up the phone and answer an incoming telephone call. Alternatively, in other embodiments, the trigger command may be an automatic response command that is issued whenever the recipient receives an incoming communication. That is, the PVA may be programmed so that whenever the recipient receives an incoming communication, the PVA is triggered without any further input from a user.

After receiving the trigger command, the PVA accesses schedule information, step 302. The schedule information is related to the recipient of the received communication. Schedule information indicates when (i.e., time(s) and date(s)) a user may be available to have a future communication with the sender of the current communication. Thus, schedule information may include information about appointments, meetings, tasks, and the like that the recipient has indicated will require time on the part of the recipient such that the recipient is going to be busy at certain times on certain days. For example, schedule information may include data taken from the user's Outlook® calendar feature, or any other calendar-type application, that indicates when the user has appointments scheduled for the next month, and how long those appointments may last. Additionally, or in some embodiments, alternatively, schedule information may include data taken from a presence server or other similar application indicating current presence and future availability. Schedule information may be derived from one or a variety of sources. For example, a user may not keep their appointment calendar application up-to-date, in which case the PVA may access other sources of schedule information, such as e-mail messages including the word "meeting", to determine when the user may be available.

The PVA then presents, to the sender, a plurality of options for arranging a future communication between the sender and the recipient, step 303. The plurality of options includes at least one option determined by the PVA based on the accessed schedule information. In some embodiments, the accessed schedule information indicates to the PVA that the user is currently in a meeting or otherwise "busy", and that this is likely the reason why the PVA is handling the incoming communication. From this schedule information, the PVA is able to determine when the current appointment is scheduled to end. For example, the schedule information may inform the PVA that the current meeting is scheduled to end in thirty minutes. When the current received communication is a telephone call, the PVA may thus determine that one option to be presented to the sender is for the recipient to call the sender back in thirty-five minutes. Alternatively, the PVA may make the time calculation for the user, and determine that the recipient is scheduled to be free at 4 PM. The option determined by the PVA, that the PVA presents to the sender, will indicate that the sender is going to have the PVA ask the recipient to call the sender back at 4 PM.

In some embodiments, the plurality of options presented to the sender by the PVA may include any number of static options that are always presented to a sender. For example, the PVA may always present a sender with the option "leave a voicemail message". In some embodiments, as is discussed below with regards to FIGS. 4 and 5, the PVA may present any number of customized options to a sender. Among the options that the PVA may present to the sender are: arrange the future communication for when user becomes free (e.g., the time of the future communication may be after a current appointment, or the next break in the recipient's schedule); arrange the future communication for a time in the near future (i.e., soon, that is, no specific time is given); arrange the future communication for a user-specified time. The recipient may also request that the PVA query the sender as to whether the received communication regards an urgent matter, or is likely to be "quick" (i.e., short in terms of time), so as to help the recipient better determine how to handle the received communication.

Note that this list of options is not limiting in any way, but rather is provided merely as examples of the various types of options that a PVA may present to a sender within the context of embodiments described herein.

After the PVA presents the plurality of options to the sender, the sender selects one of those options in any known way. For example, if the received communication is a telephone call, each option presented by the PVA may have a corresponding number. The sender may simply press the corresponding number key on his telephone keypad, or speak the number, to select an option. However the sender selects an option, the PVA receives the selection of the option for arranging a future communication, step 304. The PVA then executes the selected option to arrange the future communication, step 305. How the PVA executes the option depends on the option selected by the sender. For example, if the sender selects the option of leaving a voicemail message for the recipient, the PVA will connect the sender to the recipient's voicemail system. Alternatively, if the sender selects the option of having the recipient call the sender back in ten minutes, the PVA may acknowledge this selection audibly to the sender and then terminate the telephone call. The PVA may then inform the recipient, the sender, or both, of the arranged future communication, is described in greater detail herein.

In some embodiments, the user may, at any time in the process, interrupt the personal virtual assistant to directly arrange a future communication with the sender, step 306. The user is thus able to override the PVA or otherwise assume control of the arrangement of the future communication from the PVA at any time. For example, in the case of a telephone call, the PVA may be in the process of presenting options to the sender, when the recipient decides to interrupt. The recipient may be on a break in the middle of an on-going meeting, or an appointment may have ended earlier than expected. Whatever the reason, the recipient is able to intrude upon the communication between the PVA and the sender and begin communicating directly with the sender. The recipient and the sender need not conclude the communication at this time and may still arrange a future communication for a later time. The recipient may also override the chosen option of the sender, either prior to or after execution of that option by the PVA. For example, the recipient may learn from the PVA that the sender has decided to ask the recipient to contact the sender via telephone at 4 PM. The recipient may, despite the schedule information accessed by the PVA, not be available to speak with the sender at 4 PM. The recipient could then instruct the PVA to contact the sender, for example by e-mail, and indicate that the recipient will instead call the sender at 4:30 PM. Alternatively, the recipient could send such an e-mail directly without the assistance of the PVA.

In some embodiments, the PVA may receive a selection of a negotiation option for arranging a future communication, step 307. A negotiation option is an option through which the sender and the PVA are able to negotiate, that is, exchange suggested times and modes of communication, for arranging the future communication. The PVA will then engage in negotiation of the future communication with the sender, step 308.

This negotiation is based upon the accessed schedule information, and results in an agreed upon time and mode of communication for the future communication. In other words, a negotiation option presented by the PVA may require that the sender not only select that option, but also make further selections. For example, if the sender selects a negotiation option to arrange a future telephone call with the recipient on the upcoming Thursday, the PVA may then present a number of periods of time (that may be based on the accessed schedule information) for the sender to select one of. That is, the PVA may present to the sender that the recipient may be free to have the telephone call between 10 AM and 11 AM, between noon and 1 PM, or between 3 PM and 4 PM. The sender is then able to select the period of time that is most beneficial to the sender. In some embodiments, the PVA may confirm this selection before continuing. The details that may be negotiated between the PVA and the sender are not limited to periods of time, and may also include the day on which the future communication is to occur, the length of time needed for the future communication, the mode of communication, and the like.

Figure 4:
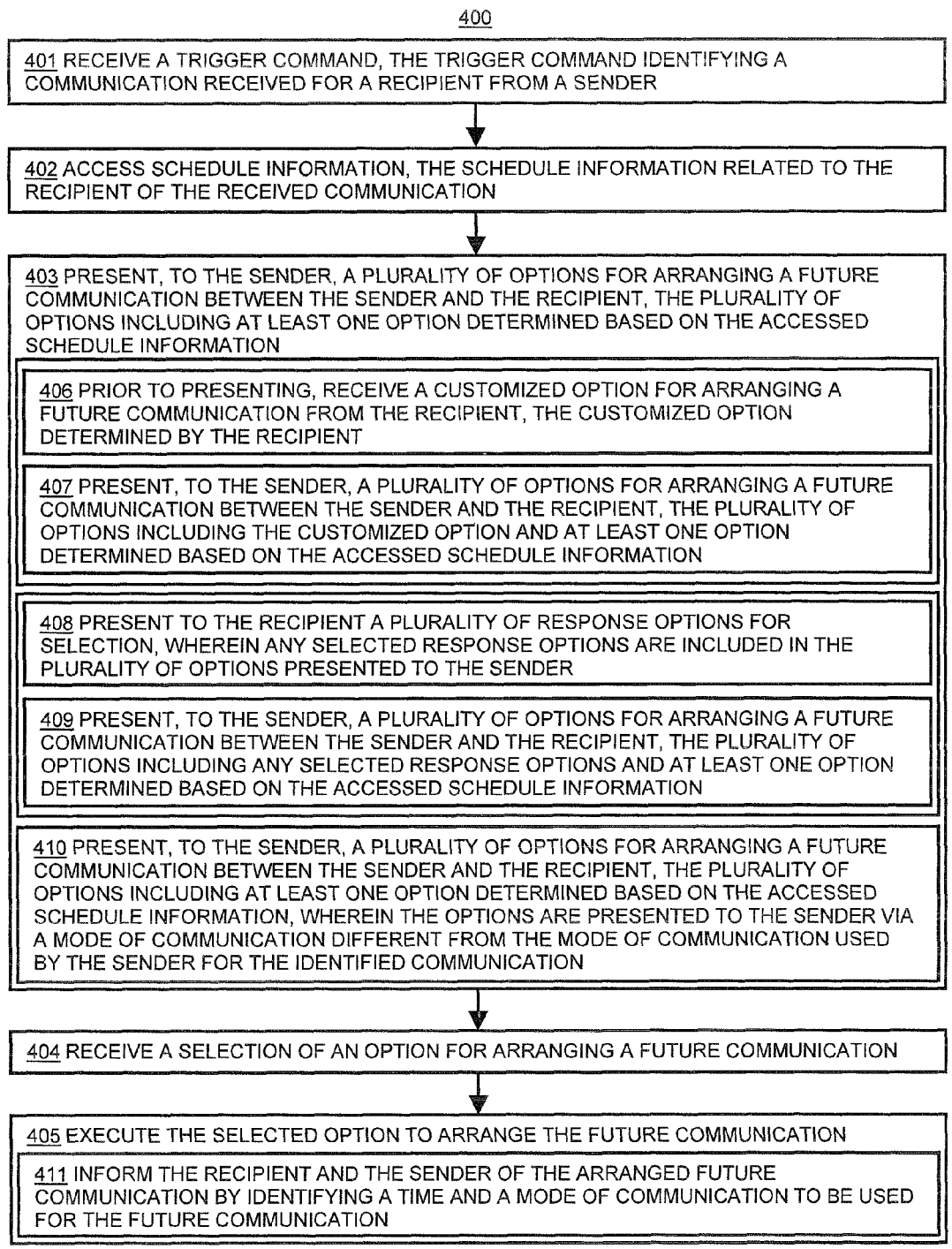
FIG. 4 illustrates a flowchart of a particular embodiment performed when a PVA uses one or more options determined by the recipient of a communication to negotiate a future communication with the sender of the communication.

In FIG. 4, the recipient of an incoming (i.e., received) communication is able to craft one or more customized options that the PVA will present to the sender of the communication, according to a method 400. The PVA receives a trigger command, step 401, the trigger command identifying a communication received for a recipient from a sender, and then accesses schedule information, step 402, the schedule information related to the recipient of the received communication. These steps are analogous to steps 301 and 302 described in regards to FIG. 3 above.

When the PVA presents, to the sender, a plurality of options for arranging a future communication between the sender and the recipient, step 403, the plurality of options includes at least one option determined based on the accessed schedule information. In some embodiments, prior to presenting, the PVA receives a customized option for arranging a future communication from the recipient, step 406. The customized option is determined by the recipient. One or more options may be customized by the recipient in any number of ways. For example, when the recipient is informed of the incoming (i.e., received) communication, the recipient may note the identity of the sender of the communication. Based on this information, the recipient may, for example, want to make sure he/she communicates with the sender as soon as possible. The recipient (who may be named, for example, Raji) may thus instruct the PVA to change the standard "Raji will contact you in thirty minutes" option to "Raji will contact you in 10 minutes". A customized option need not be an existing option that the recipient modifies, but may be a new or non-default option that the recipient wants the PVA to present to the sender.

The PVA then presents, to the sender, a plurality of options for arranging a future communication between the sender and the recipient, the plurality of options including the customized option and at least one option determined based on the accessed schedule information, step 407. The sender is then able to select the customized option, if desired. In other embodiments, the PVA presents, to the recipient, a plurality of response options for selection, step 408. The user is then able to select any one or more of the presented response options. Any selected response options are included in the plurality of options presented to the sender. The response options may include, for example, a number of default options that are pre-programmed into the PVA, as well as other options that have been added to the PVA. For example, the PVA may store any previously presented customized options, and make these options part of the pool of selectable response options. In some embodiments, the PVA may learn, rearrange, and/or create a subset of the most-often used options by the recipient (i.e., user) and customize that subset based on how the recipient treats the sender. The PVA may present the response options to the recipient at any time prior to when the PVA is to present options to the sender.

After the recipient selects any number of response options for inclusion, the PVA receives this selection and adds any included response options to the plurality of options to be presented to the sender. Ultimately, the PVA presents, to the sender, a plurality of options for arranging a future communication between the sender and the recipient, the plurality of options including any selected response options and at least one option determined based on the accessed schedule information, step 409.

In some embodiments, the PVA may change the mode of communication it uses to communicate with the sender when the PVA presents options to the sender. That is, the PVA presents, to the sender, a plurality of options for arranging a future communication between the sender and the recipient, the plurality of options including at least one option determined based on the accessed schedule information, wherein the options are presented to the sender via a mode of communication different from the mode of communication used by the sender for the identified communication, step 410. For example, if the received communication is a telephone call, the PVA may determine that the quality of audio being communicated via the telephone connection is substandard, and that the sender is unlikely to be able to clearly understand the PVA when the PVA presents options to the sender. The PVA may then, for example, compose an e-mail to the sender that includes the options and requests a reply message, and thus the PVA presents the options via e-mail instead of the telephone connection.

However the PVA presents options to the sender, in response the PVA, as described in greater detail above, receives a selection of an option for arranging a future communication, step 404, and executes the selected option to arrange the future communication, step 405 (analogous to steps 304 and 305 as described above with regards to FIG. 3). In some embodiments, including those not depicted in FIG. 4, the PVA may also inform the recipient and the sender of the arranged future communication by identifying a time and a mode of communication to be used for the future communication, step 411. For example, after the sender and the PVA arrange the future communication, the PVA may send an e-mail message to both the recipient and the sender, confirming that the recipient is going to call the sender at 4:30 PM on Tuesday. Informing both the sender and the recipient of the time and mode of communication for the future communication makes it easier for the sender or the recipient to make changes to the arranged future communication, if needed. Using the previous example, where the sender and the PVA of the recipient arranged a phone call from the recipient for 5 PM, the details contained in an e-mail sent to both, the sender may later discover that he needs to be present at a meeting lasting from 4 PM to 5:30 PM. The sender could then contact the recipient again, this time perhaps by an e-mail reply indicating that 4:30 PM is no longer a good time for the recipient to call, and could the recipient possibly call at 5:35 PM. Of course the sender and the recipient may use any means to re-arrange the future communication, including using the PVA. That is, in some embodiments, if the sender contacts the recipient again, and communicates with the PVA again, the PVA may be configured to identify the sender as someone with whom a future communication has already been arranged. The PVA may then include, in the options presented to the sender, an option to cancel or edit the previously arranged future communication. Alternatively, in some embodiments, the PVA may notice that the sender and the recipient are engaged in a communication that is not the arranged future communication, and may offer, in options presented to the user, an option to cancel or edit the previously arranged future communication. In some embodiments, when the time for the future communication has arrived, the PVA may present a number of options to a user, such as but not limited to initiate the communication, re-negotiate the future communication, or dismiss the future communication.

Figure 5:
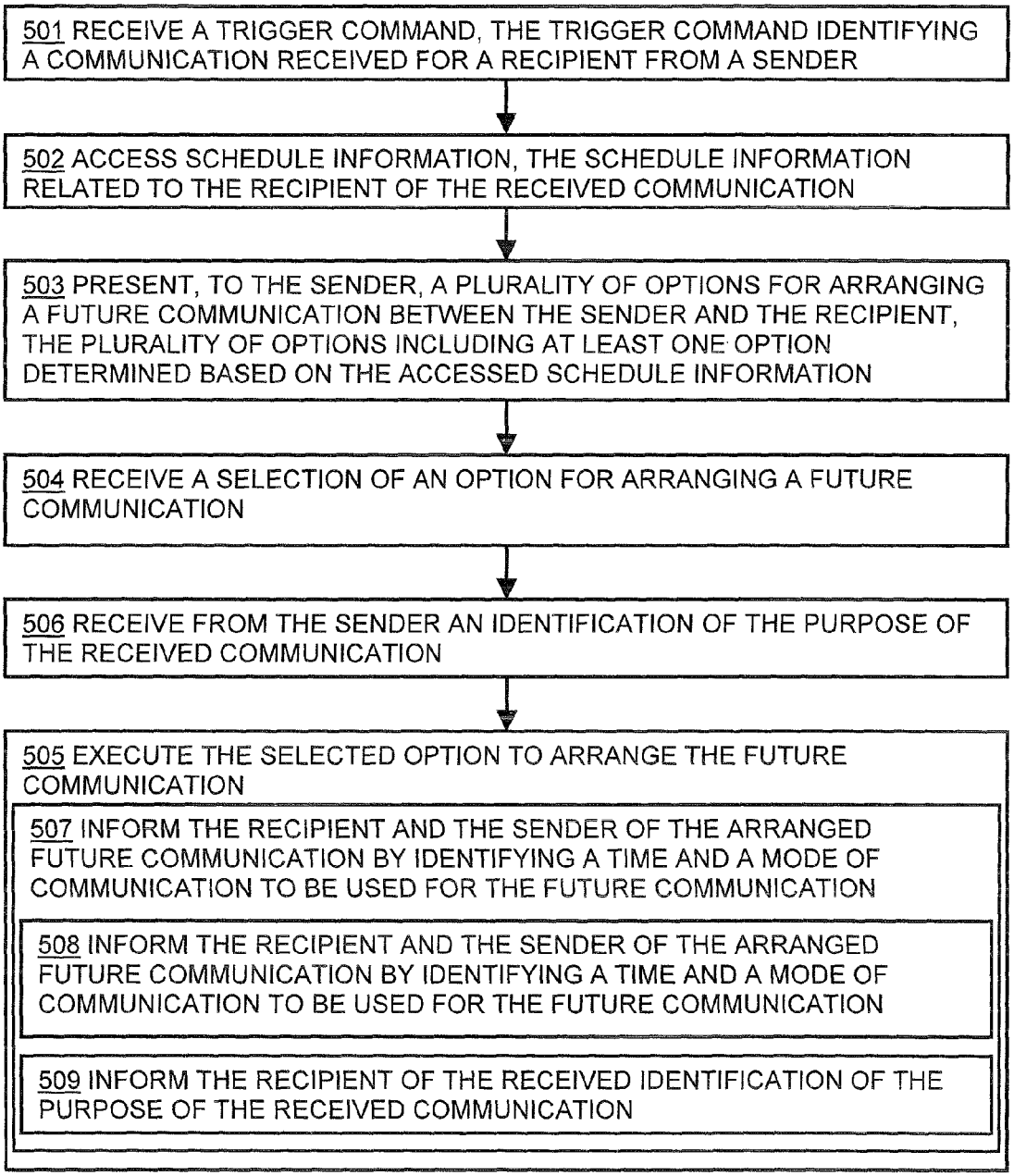
FIG. 5 illustrates a flowchart of a particular embodiment performed when a PVA, while negotiating a future communication, learns of the purpose of the received communication.

FIG. 5 illustrates an embodiment 500 of a personal virtual assistant negotiating a future communication between the recipient and the sender of a received communication, where the sender informs the PVA of the purpose of the received communication. The PVA first performs steps 501, 502, 503, and 504, which are analogous to steps 301, 302, 303, and 304, described above. When presenting the plurality of options to the sender, one or more of the options may include the ability for the sender to identify the purpose of the received communication. Should the sender select that kind of option, if, for example, the received communication is a telephone call, the sender may indicate to the PVA that the reason the sender called the recipient was to discuss a patent disclosure. The sender may do this by speaking the purpose over the telephone to the PVA when prompted to do so by the PVA. The PVA would then record the sender's voice stating the purpose of the telephone call. In other words, the PVA receives, from the sender, an identification of the purpose of the received communication, step 506. This purpose may be indicated in any number of ways, and how the purpose is received by the PVA may depend on the mode of communication between the PVA and the sender. For example, if the PVA and the sender are communicating in an instant message session, the sender may send a further instant message, containing the purpose, to the PVA.

After the PVA executes the selected option to arrange the future communication, step 505, the PVA also informs the recipient and the sender of the arranged future communication by identifying a time and a mode of communication to be used for the future communication, step 507/step 508. If the PVA has received a purpose of the received communication, the PVA may also inform the recipient of the received identification of the purpose of the received communication, step 509. The PVA may include the purpose of the received communication in whatever message type the PVA uses to inform the recipient of the future communication. For example, if the PVA sends an e-mail to the recipient, indicating a future telephone call with the sender at 5 PM, and the sender spoke via telephone with the PVA, the PVA may attach an audio file of the purpose of the received communication as recorded by the PVA. Alternatively, if the PVA informs the recipient of the future communication by a voicemail left on the recipient's cellular telephone voicemail system, the PVA may append the audio recording of the purpose of the received communication to the voicemail message. Further, if the purpose of the received communication was received by the PVA in a text format, the PVA might, as part of the voicemail message, inform the user to check their text messages on their cell phone after the user finishes listening to the voicemail message. The PVA need not inform the sender of the purpose of the received communication, but in some embodiments, the PVA includes the purpose when informing the sender of the arranged future communication.

Figure 6:
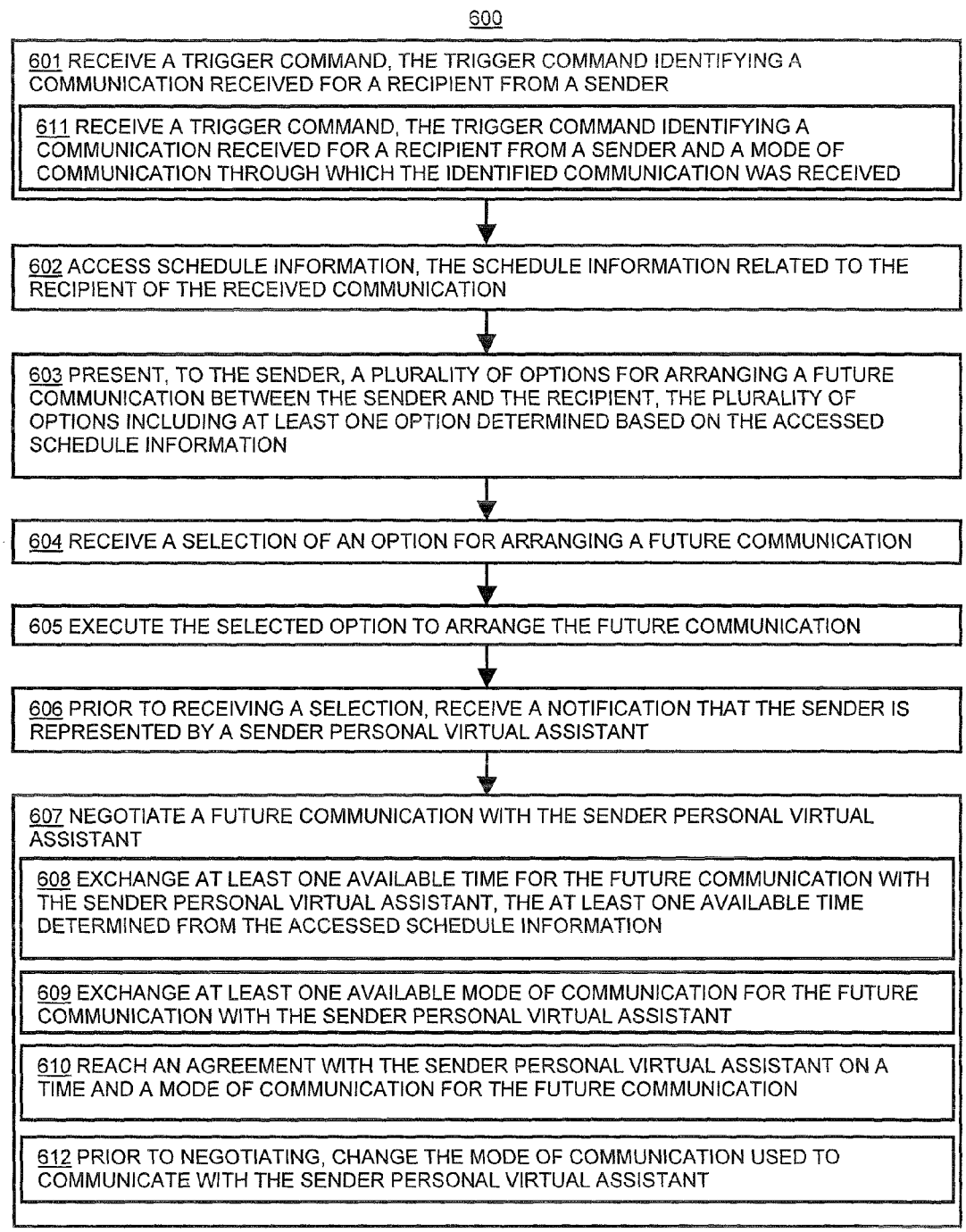
FIG. 6 illustrates a flowchart of a particular embodiment performed when a PVA acting on behalf of a recipient negotiates a future communication with another PVA acting on behalf of a sender of a communication.

In FIG. 6, the PVA arranges a future communication by negotiating with another PVA that represents the sender according to, in one embodiment, a method 600 as shown. The PVA performs the usual actions in arranging a future communication. That is, the PVA receives a trigger command, the trigger command identifying a communication received for a recipient from a sender, step 601; access schedule information, the schedule information related to the recipient of the received communication, step 602; presents, to the sender, a plurality of options for arranging a future communication between the sender and the recipient, the plurality of options including at least one option determined based on the accessed schedule information, step 603; receives a selection of an option for arranging a future communication, step 604; and executes the selected option to arrange the future communication, step 605. (These steps are all analogous to steps 301-305 described in greater detail above.)

Here, however, at some point while performing these actions but prior to receiving a selection of an option, the PVA (denoted herein as the recipient PVA) receives a notification that the sender is represented by a sender personal virtual assistant, step 606. This notification may come in any variety of ways. For example, the sender PVA may transmit a signal or message to the recipient PVA that contains the notification. In some embodiments, the recipient PVA may present, as an option to the sender, "Transfer to [sender]'s PVA" or the like. The sender, upon selecting that option, would provide to the notification to the recipient PVA. At the same time, the sender would also need to activate his/her own PVA.

At whatever point the recipient PVA received the notification, the recipient PVA proceeds to negotiate a future communication with the sender personal virtual assistant, step 607. The negotiation may be conducted in any of the ways described above, with the sender PVA taking over the decision-making from the sender. The actions of the sender PVA may mirror the actions of the recipient PVA; that is, the sender PVA may access schedule information related to the sender. Further, during the negotiation, the sender PVA may present a plurality of options (for arranging some aspect of the future communication) to the recipient PVA, from which the recipient PVA will have to chose an option. Also note that either user of either PVA may provide some basic instruction or instructions (for example, such as "arrange the future communication for any time tomorrow") to their respective PVA that sets up a framework or boundaries for that PVA to work within.

In some embodiments, the recipient PVA may negotiate with the sender PVA by exchanging at least one available time for the future communication with the sender personal virtual assistant, the at least one available time determined from the accessed schedule information, step 608, or exchanging at least one available mode of communication for the future communication with the sender personal virtual assistant, step 609, or by doing both.

At the conclusion of the negotiation between the recipient PVA and the sender PVA, the recipient PVA reaches an agreement with the sender personal virtual assistant on a time and a mode of communication for the future communication, step 610. The sender PVA and the recipient PVA may then each inform their respective users (i.e., the sender and the recipient) of the arranged future communication, as described above.

In some embodiments, the recipient PVA may change the mode of communication for conducting the negotiation with the sender PVA. In these embodiments, when the PVA receives the trigger command, step 601, the PVA receives a trigger command, the trigger command identifying a communication received for a recipient from a sender and a mode of communication through which the identified communication was received, step 611. For example, the received communication from the sender (prior to the sender PVA becoming involved) may be a telephone call, so the trigger command will identify the mode of communication as a telephone call. Then, prior to negotiating, the recipient PVA may change the mode of communication used to communicate with the sender personal virtual assistant, step 612. For example, the recipient PVA and the sender PVA may find that communicating using synthesized audio signals via a telephone connection is a less efficient mode of communication that exchanging e-mails or instant messages. The recipient PVA would thus arrange with the sender PVA to establish an e-mail session or instant message session to conduct the negotiation through. Note that the sender PVA may initiate this action instead of the recipient PVA, and that some level of negotiation may occur on the mode of communication to change to. That is, if the recipient PVA wants to change to an instant message session, but the sender PVA is unable to access an instant message client on behalf of the sender, a different mode of communication will need to be used.

Figure 7:
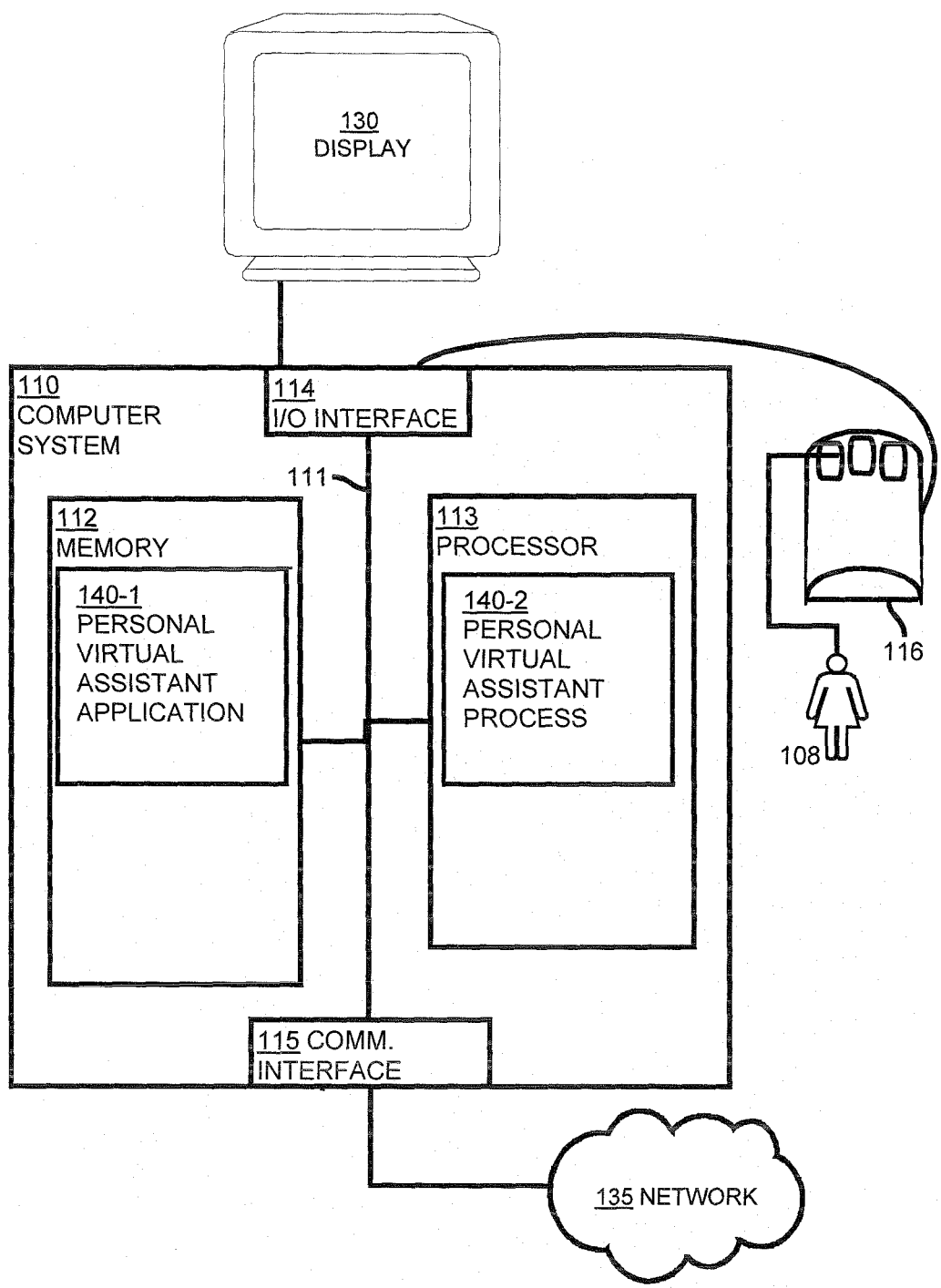
FIG. 7 is a block diagram illustrating an example architecture of a computer system 110 that executes, runs, interprets, operates or otherwise performs a personal virtual assistant application and a personal virtual assistant process as described herein.

FIG. 7 is a block diagram illustrating an example architecture of a computer system 110 that executes, runs, interprets, operates or otherwise performs a personal virtual assistant application 140-1 and a personal virtual assistant process 140-2 suitable for use in explaining example configurations disclosed above. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108, such as the recipient of an incoming communication, to provide input commands and generally control a graphical user interface 160 shown on a display 130. The communications interface 115 enables the computer system 110 to communicate with other devices (e.g., other computers) on a network (not shown in FIG. LAST).

The memory system 112 is any type of computer readable medium and in this example is encoded with a personal virtual assistant application 140-1. The personal virtual assistant application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the personal virtual assistant application 140-1. Execution of the personal virtual assistant application 140-1 in this manner produces processing functionality in a personal virtual assistant process 140-2. In other words, the personal virtual assistant process 140-2 represents one or more portions or runtime instances of the personal virtual assistant application 140-1 performing or executing within or upon the processor 113 in the computer system 110 at runtime.

Generally, while operating the computer system 110, the user 108 manipulates at least one input device 116, such as a computer mouse. Through the manipulation of the at least one input device 116, the user 108 may provide input to a graphical user interface 160 (though otherwise not shown in detail). For example, the user 108 might engage the personal virtual assistant application 140-1 by selecting an option displayed within the graphical user interface 160 on the display device 130. The personal virtual assistant application 140-1, executing as the personal virtual assistant process 140-2, receives that input, such as through signals, indicating how the user wishes the personal virtual assistant process 140-2 to deal with the incoming communication, as described herein.

It is noted that example configurations disclosed herein include the personal virtual assistant application 140-1 itself including the personal virtual assistant process 140-2 (i.e., in the form of un-executed or non-performing logic instructions and/or data). The personal virtual assistant application 140-1 may be stored on a computer readable medium (such as a floppy disk), hard disk, electronic, magnetic, optical or other computer readable medium. The personal virtual assistant application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the personal virtual assistant application 140-1 in the processor 113 as the personal virtual assistant process 140-2. Those skilled in the art will understand that the computer system 110 may include other processes and/or software and hardware components, such as an operating system not shown in this example. The display 130 need not be coupled directly to computer system 110. For example, the personal virtual assistant application 140-1 may be executed on a remotely accessible computerized device (such as, but not limited to, a cellular telephone) via the network interface 115. In this instance, the graphical user interface 160 may be displayed locally to a user of the remote computer and execution of the processing herein may be client-server based.

The PVA has been described herein as dealing with only a single received communication/sender/sender PVA at a time, for purposes of a simple and clear description. However, the PVA is not so limited in practice, and those of ordinary skill in the art will easily be able to expand any embodiments described herein so that the PVA is able to deal with multiple communications/senders/sender PVAs at any given time.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of negotiating a future communication through a personal virtual assistant (PVA), the method comprising:

identifying an incoming telephone call via execution of a receiver Personal Virtual Assistant (PVA) that acts as a proxy on behalf of a recipient, the incoming telephone call intended for the recipient and initiated by a sender, the receiver PVA being executed in parallel with a telephone communication system;

accessing, by the receiver PVA, calendar information that corresponds to the recipient of the incoming telephone call;

the receiver PVA interrupting a display of a recipient graphical user interface of a device that corresponds to the recipient, and displaying selectable options for responding to the incoming telephone call, the selectable options displayed including an option to answer the incoming telephone call, an option to send the incoming telephone call to voice mail, and an option to schedule callback within a specific period of time;

receiving, via the recipient graphical user interface, a selection of the option to schedule callback within the specific period of time;

in response to receiving the selection of the option to schedule callback within the specific period of time, displaying, on a sender graphical user interface of a device that corresponds to the sender, selectable options for arranging a future telephone call between the sender and the recipient, the selectable options including an option to accept callback within the specific period of time, an option to leave a voice mail message, and an option to request a time in the future to schedule callback;

in response to a failure to receive a selection of an option via the recipient graphical user interface, displaying, on the sender graphical user interface of the device that corresponds to the sender, selectable options for arranging a future telephone call between the sender and the recipient, the selectable options including the option to leave a voice mail message, and the option to request a time in the future to schedule callback;

receiving, via the sender graphical user interface, a selection of the option to request the time in the future to schedule callback;

executing by said receiver PVA the selected option to request the time in the future to schedule callback by negotiating a future telephone call time with a sender PVA that acts as a proxy on behalf of the sender, the future telephone call time being based on accessed calendar information that corresponds to the recipient; and receiving input, via the recipient graphical user interface, that interrupts negotiations between the receiver PVA and the sender PVA, the input overriding the receiver PVA by directly arranging a future telephone call between the sender and the recipient.

2. The method of claim 1, further comprising:

prior to displaying selectable options on the sender graphical user interface, receiving a user-specified time as an additional option for arranging the future telephone call between the sender and the recipient, the user-specified time received via the recipient graphical user interface; and wherein displaying selectable options for arranging the future telephone call between the sender and the recipient includes displaying the additional option to accept callback at the user-specified time, and displaying an option to accept a callback at a time determined based on the accessed calendar information.

3. The method of claim 1, further comprising:

wherein receiving, via the recipient graphical user interface, the selection of the option to schedule callback at the given time, includes receiving at least one additional option for responding to the incoming telephone call; and wherein displaying selectable options for arranging the future telephone call between the sender and the recipient includes displaying the at least one additional option determined based on the accessed calendar information.

4. The method of claim 1, wherein displaying, on the sender graphical user interface, selectable options for arranging a future telephone call between the sender and the recipient includes displaying at least one option determined based on the accessed calendar information, and displaying the selectable options via a pop-up.

5. The method of claim 1 wherein executing the selected option by the receiver PVA includes:

informing the recipient and the sender of the arranged future telephone call by identifying a time to be used for the future telephone call.

6. The method of claim 5, further comprising:
receiving, via the sender graphical user interface, an identification of the purpose of the incoming telephone call; and
displaying, on the recipient graphical user interface, the received identification of the purpose of the incoming telephone call.

7. The method of claim 1, further comprising:
receiving, via the sender graphical user interface, a selection of a negotiation option for arranging a future telephone call; and
negotiating the future telephone call time with the sender, wherein the negotiation is based upon the accessed calendar information and results in an agreed upon time for the future telephone call.

8. The method of claim 1 wherein negotiating the future telephone call time with the sender PVA comprises:
exchanging at least one available time for the future communication with the sender personal virtual assistant, the at least one available time determined from the accessed calendar information; and
reaching an agreement with the sender personal virtual assistant on a time and a mode of communication for the future telephone call.

9. The method of claim 1 further comprising:
receiving input, via the sender graphical user interface, that overrides a decision made by the sender PVA, the input received during negotiations taking place between said sender PVA and said receiver PVA.

10. The method of claim 1 further comprising:
receiving input, via the receiver graphical user interface, that overrides a decision made by the receiver PVA, the input received during negotiations taking place between said sender PVA and said receiver PVA.

11. The method of claim 1, further comprising:
in response to displaying selectable options for responding to the incoming telephone call on the display of the recipient graphical user interface, receiving input via the recipient graphical user interface that modifies the option to schedule callback within the specific period of time by changing an initial period of time to schedule the callback to a different period of time to schedule the callback; and
wherein displaying, on the sender graphical user interface of the device that corresponds to the sender, selectable options for arranging a future telephone call between the sender and the recipient, includes displaying the option to accept callback within the specific period of time as being the different period of time to schedule the callback as modified via the recipient graphical user interface.

12. The method of claim 11, further comprising:
receiving, via the sender graphical user interface, a selection of a negotiation option for arranging a future telephone call;
negotiating the future telephone call time with the sender, wherein the negotiation is based upon the accessed calendar information and results in an agreed upon time for the future telephone call;
wherein negotiating the future telephone call time with the sender PVA comprises:
exchanging at least one available time for the future communication with the sender personal virtual assistant, the at least one available time determined from the accessed calendar information; and
reaching an agreement with the sender personal virtual assistant on a time and a mode of communication for the future telephone call; and
wherein displaying, on the sender graphical user interface, selectable options for arranging a future telephone call between the sender and the recipient includes displaying at least one option determined based on the accessed calendar information, and displaying the selectable options via a pop-up.

13. The method of claim 12, further comprising:
prior to displaying selectable options on the sender graphical user interface, receiving a user-specified time as an additional option for arranging the future telephone call between the sender and the recipient, the user-specified time received via the recipient graphical user interface;
wherein displaying selectable options for arranging the future telephone call between the sender and the recipient includes displaying the additional option to accept callback at the user-specified time, and displaying an option to accept a callback at a time determined based on the accessed calendar information;
wherein receiving, via the recipient graphical user interface, the selection of the option to schedule callback at the given time, includes receiving at least one additional option for responding to the incoming telephone call;
wherein displaying selectable options for arranging the future telephone call between the sender and the recipient includes displaying the at least one additional option determined based on the accessed calendar information;
wherein executing the selected option by the receiver PVA includes informing the recipient and the sender of the arranged future telephone call by identifying a time to be used for the future telephone call;
receiving, via the sender graphical user interface, an identification of the purpose of the incoming telephone call; and
displaying, on the recipient graphical user interface, the received identification of the purpose of the incoming telephone call.

14. The method of claim 13, further comprising:
receiving input, via the sender graphical user interface, that overrides a decision made by the sender PVA, the input received during negotiations taking place between said sender PVA and said receiver PVA; and
receiving input, via the receiver graphical user interface, that overrides a decision made by the receiver PVA, the input received during negotiations taking place between said sender PVA and said receiver PVA.

15. A computer program product, stored on computer readable medium, that when executed on a processor negotiates a future communication through a personal virtual assistant (PVA), the computer program product comprising:
computer program code for identifying an incoming telephone call via execution of a receiver Personal Virtual Assistant (PVA) that acts as a proxy on behalf of a recipient, the incoming telephone call intended for the recipient and initiated by a sender, the receiver PVA being executed in parallel with a telephone communication system;
computer program code for accessing, by the receiver PVA, calendar information that corresponds to the recipient of the incoming telephone call;
computer program code for the receiver PVA interrupting a display of a recipient graphical user interface of a device that corresponds to the recipient, and displaying selectable options for responding to the incoming telephone call, the selectable options displayed including an option to answer the incoming telephone call, an option to send the incoming telephone call to voice mail, and an option to schedule callback within a specific period of time;

computer program code for receiving, via the recipient graphical user interface, a selection of the option to schedule callback within the specific period of time;

computer program code for, in response to receiving the selection of the option to schedule callback within the specific period of time, displaying, on a sender graphical user interface of a device that corresponds to the sender, selectable options for arranging a future telephone call between the sender and the recipient, the selectable options including an option to accept callback within the specific period of time, an option to leave a voice mail message, and an option to request a time in the future to schedule callback;

computer program code for, in response to a failure to receive a selection of an option via the recipient graphical user interface, displaying, on the sender graphical user interface of the device that corresponds to the sender, selectable options for arranging a future telephone call between the sender and the recipient, the selectable options including the option to leave a voice mail message, and the option to request a time in the future to schedule callback;

computer program code for receiving, via the sender graphical user interface, a selection of the option to request the time in the future to schedule callback;

computer program code for executing by said receiver PVA the selected option to request the time in the future to schedule callback by negotiating a future telephone call time with a sender PVA that acts as a proxy on behalf of the sender, the future telephone call time being based on accessed calendar information that corresponds to the recipient; and computer program code for receiving input, via the recipient graphical user interface, that interrupts negotiations between the receiver PVA and the sender PVA, the input overriding the receiver PVA by directly arranging a future telephone call between the sender and the recipient.

16. The computer program product of claim 15, further comprising:
prior to displaying selectable options on the sender graphical user interface, computer program code for receiving a user-specified time as an additional option for arranging the future telephone call between the sender and the recipient, the user-specified time received via the recipient graphical user interface; and wherein computer program code for displaying selectable options for arranging the future telephone call between the sender and the recipient includes computer program code for displaying the additional option to accept callback at the user-specified time, and displaying an option to accept a callback at a time determined based on the accessed calendar information.

17. The computer program product of claim 15, further comprising:
wherein computer program code for receiving, via the recipient graphical user interface, the selection of the option to schedule callback at the given time, includes computer program code for receiving at least one additional option for responding to the incoming telephone call;

wherein computer program code for displaying selectable options for arranging the future telephone call between the sender and the recipient includes computer program code for displaying the and at least one additional option determined based on the accessed calendar information; and wherein computer program code for displaying, on the sender graphical user interface, selectable options for arranging a future telephone call between the sender and the recipient includes computer program code for displaying at least one option determined based on the accessed calendar information, and displaying the selectable options via a pop-up.

18. The computer program product of claim 15 wherein computer program code for executing the selected option by the receiver PVA includes:
computer program code for informing the recipient and the sender of the arranged future telephone call by identifying a time to be used for the future telephone call;

computer program code for receiving, via the sender graphical user interface, an identification of the purpose of the incoming telephone call; and computer program code for displaying, on the recipient graphical user interface, the received identification of the purpose of the incoming telephone call.

19. The computer program product of claim 15, further comprising:
computer program code for receiving, via the sender graphical user interface, a selection of a negotiation option for arranging a future telephone call; and computer program code for negotiating the future telephone call time with the sender, wherein the negotiation is based upon the accessed calendar information and results in an agreed upon time for the future telephone call.

20. The computer program product of claim 15 wherein computer program code for negotiating the future telephone call time with the sender PVA comprises:
computer program code for exchanging at least one available time for the future communication with the sender personal virtual assistant, the at least one available time determined from the accessed calendar information; and computer program code for reaching an agreement with the sender personal virtual assistant on a time and a mode of communication for the future telephone call.

21. The computer program product of claim 15 further comprising:
computer program code for receiving input, via the sender graphical user interface, that overrides a decision made by the sender PVA, the input received during negotiations taking place between said sender PVA and said receiver PVA; and computer program code for receiving input, via the receiver graphical user interface, that overrides a decision made by the receiver PVA, the input received during negotiations taking place between said sender PVA and said receiver PVA.

22. A system comprising:
a processor;
a memory system;
a network interface;

and an interconnection mechanism coupling the processor, memory system, and network interface, allowing communication there between; wherein the memory system is encoded with a personal virtual assistant (PVA) application that, when executed in the processor, provides a personal virtual assistant process that negotiates a future communication between a recipient and a sender by causing the computer system to perform operations of:

identifying an incoming telephone call via execution of a receiver Personal Virtual Assistant (PVA) that acts as a proxy on behalf of a recipient, the incoming telephone call intended for the recipient and initiated by a sender, the receiver PVA being executed in parallel with a telephone communication system;

accessing, by the receiver PVA, calendar information that corresponds to the recipient of the incoming telephone call;

the receiver PVA interrupting a display of a recipient graphical user interface of a device that corresponds to the recipient, and displaying selectable options for responding to the incoming telephone call, the selectable options displayed including an option to answer the incoming telephone call, an option to send the incoming telephone call to voice mail, and an option to schedule callback within a specific period of time;

receiving, via the recipient graphical user interface, a selection of the option to schedule callback within the specific period of time;

in response to receiving the selection of the option to schedule callback within the specific period of time, displaying, on a sender graphical user interface of a device that corresponds to the sender, selectable options for arranging a future telephone call between the sender and the recipient, the selectable options including an option to accept callback within the specific period of time, an option to leave a voice mail message, and an option to request a time in the future to schedule callback;

in response to a failure to receive a selection of an option via the recipient graphical user interface, displaying, on the sender graphical user interface of the device that corresponds to the sender, selectable options for arranging a future telephone call between the sender and the recipient, the selectable options including the option to leave a voice mail message, and the option to request a time in the future to schedule callback;

receiving, via the sender graphical user interface, a selection of the option to request the time in the future to schedule callback;

executing by said receiver PVA the selected option to request the time in the future to schedule callback by negotiating a future telephone call time with a sender PVA that acts as a proxy on behalf of the sender, the future telephone call time being based on accessed calendar information that corresponds to the recipient; and receiving input, via the recipient graphical user interface, that interrupts negotiations between the receiver PVA and the sender PVA, the input overriding the receiver PVA by directly arranging a future telephone call between the sender and the recipient.

* * * * *

UNITED STATES PATENT AND TRADEMARK OFFICE
CERTIFICATE OF CORRECTION

PATENT NO.         : 9,703,520 B1                                                              Page 1 of 1
APPLICATION NO. : 12/038432
DATED              : July 11, 2017
INVENTOR(S)        : Krishnaswamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1674 days.

Signed and Sealed this
Twenty-fifth Day of September, 2018

Andrei Iancu
*Director of the United States Patent and Trademark Office*